United States Patent

Niedringhaus

(10) Patent No.: US 9,433,894 B2
(45) Date of Patent: Sep. 6, 2016

(54) REMOVAL OF HYDROGEN SULFIDE FROM GAS STREAMS

(71) Applicant: TRONOX ALKALI WYOMING CORPORATION, Stamford, CT (US)

(72) Inventor: Gerald Niedringhaus, Rock Springs, WY (US)

(73) Assignee: Tronox Alkali Wyoming Corporation, Stamford, CT (US)

( * ) Notice: Subject to any disclaimer, the term of this patent is extended or adjusted under 35 U.S.C. 154(b) by 211 days.

(21) Appl. No.: 14/261,550

(22) Filed: Apr. 25, 2014

(65) Prior Publication Data

US 2014/0335001 A1  Nov. 13, 2014

Related U.S. Application Data

(60) Provisional application No. 61/821,396, filed on May 9, 2013.

(51) Int. Cl.
| | | |
|---|---|---|
| *B01D 53/52* | (2006.01) | |
| *B01D 53/78* | (2006.01) | |
| *C01D 7/12* | (2006.01) | |
| *C01D 7/22* | (2006.01) | |

(52) U.S. Cl.
CPC .............. *B01D 53/526* (2013.01); *B01D 53/52* (2013.01); *B01D 53/78* (2013.01); *C01D 7/126* (2013.01); *B01D 2251/304* (2013.01); *B01D 2251/606* (2013.01); *B01D 2256/22* (2013.01)

(58) Field of Classification Search
None
See application file for complete search history.

(56) References Cited

U.S. PATENT DOCUMENTS

| | | |
|---|---|---|
| 2,388,009 A | 10/1945 | Pike |
| 3,050,290 A | 8/1962 | Caldwell et al. |
| 3,119,655 A | 1/1964 | Frint et al. |
| 3,184,287 A | 5/1965 | Gancy |
| 3,779,602 A | 12/1973 | Beard et al. |
| 3,932,583 A | 1/1976 | Schievelbein |
| 3,934,012 A | 1/1976 | Schievelbein |
| 4,258,019 A | 3/1981 | Hiller et al. |
| 4,264,104 A | 4/1981 | Helvenston et al. |
| 4,285,915 A * | 8/1981 | Saldick ................. C01B 17/165 23/302 T |
| 4,636,289 A * | 1/1987 | Mani .................... B01D 61/445 204/534 |
| 4,815,790 A | 3/1989 | Rosar et al. |
| 4,869,882 A | 9/1989 | Dome et al. |
| 5,043,149 A | 8/1991 | Frint et al. |
| 5,192,164 A | 3/1993 | Frint et al. |
| 5,262,134 A | 11/1993 | Frint et al. |
| 5,283,054 A | 2/1994 | Copenhafer et al. |
| 5,766,270 A | 6/1998 | Neuman et al. |
| 5,955,043 A | 9/1999 | Neuman et al. |
| 6,228,335 B1 | 5/2001 | Copenhafer et al. |
| 6,576,206 B2 | 6/2003 | Copenhafer et al. |
| 6,589,497 B2 | 7/2003 | Smith |
| 6,699,447 B1 | 3/2004 | Nielsen et al. |
| 7,645,435 B2 | 1/2010 | Braman et al. |
| 2009/0200854 A1 | 8/2009 | Vinegar |
| 2010/0066153 A1 | 3/2010 | Day et al. |

\* cited by examiner

*Primary Examiner* — Daniel Berns
(74) *Attorney, Agent, or Firm* — Williams Mullen PC; F. Michael Sajovec

(57) ABSTRACT

A method for removing hydrogen sulfide from a gas stream in a gas-liquid absorber apparatus having two separate absorption sections and utilizing a first absorber alkali solution stream that is a waste sodium carbonate source from a soda ash production facility and a second absorber alkali solution stream that is a process feed stream from a soda ash production facility. The method is particularly well suited for removing $H_2S$ from a $CO_2$-containing gas stream generated in a soda ash production facility.

20 Claims, 1 Drawing Sheet

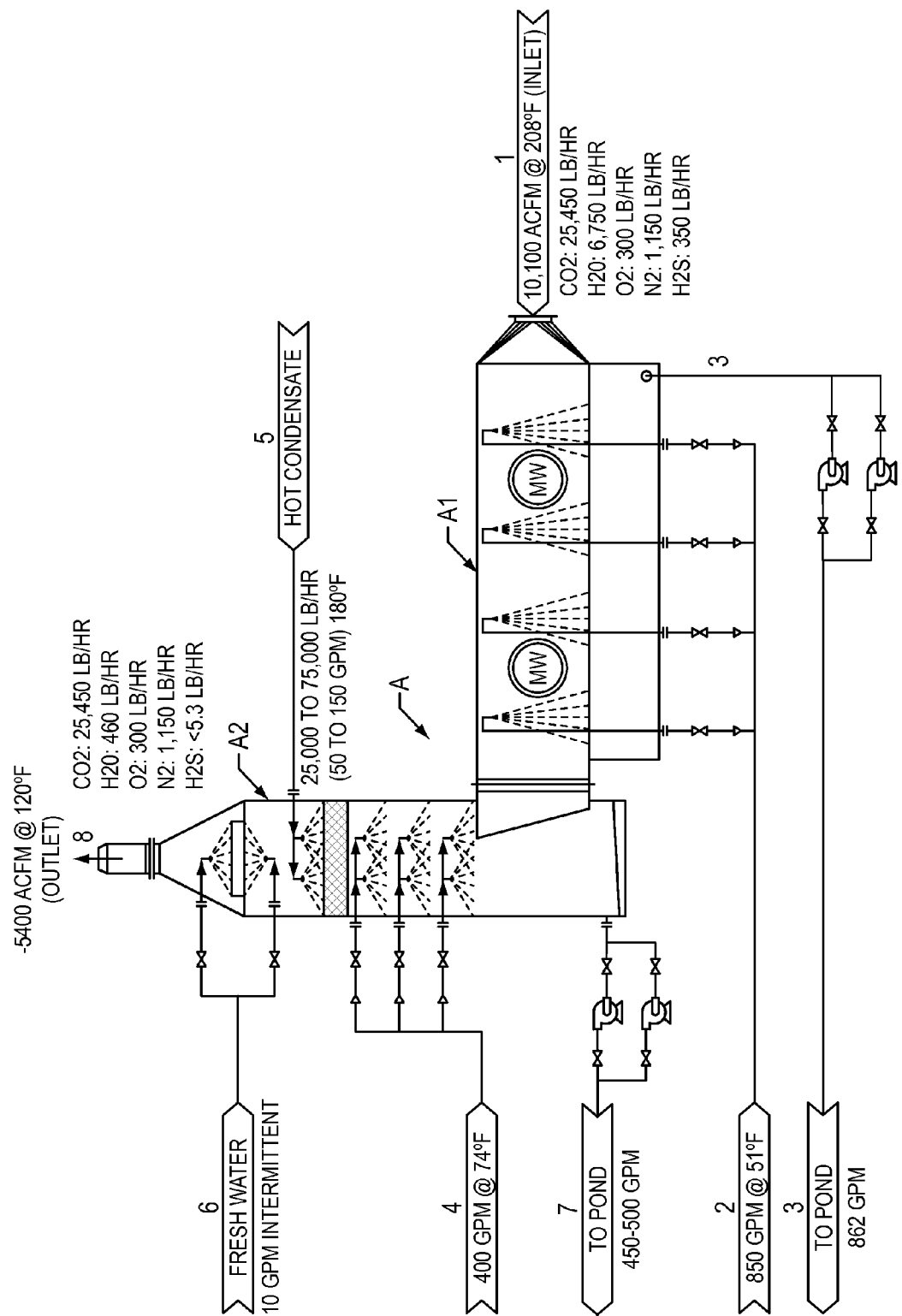

REMOVAL OF HYDROGEN SULFIDE FROM GAS STREAMS

FIELD OF THE INVENTION

The present invention relates to the removal of hydrogen sulfide from a gas stream and more particularly to the selective removal of hydrogen sulfide from a carbon dioxide gas stream in a gas-liquid absorber using two separate aqueous alkali sodium carbonate solutions obtained from a soda ash production facility.

BACKGROUND OF THE INVENTION

Sodium carbonate ($Na_2CO_3$), also called soda ash, is an important, high volume chemical produced in the United States and used in the manufacture of glass, chemicals, soaps and detergents, and aluminum, as well as in textile processing, petroleum refining and water treatment, among many other uses.

In the United States, almost all soda ash (sodium carbonate, $Na_2CO_3$) is obtained from subterranean deposits of naturally-occurring trona ore (as a primary source) and nahcolite ore (as a secondary source). The largest known trona ore deposits in the United States are located in the Green River Basin in southwestern Wyoming, mostly in Sweetwater County, Wyo., and are typically about 800 to 3000 feet below ground level. Nahcolite ore (naturally-occurring sodium bicarbonate, $NaHCO_3$) deposits are located in the Piceance Creek Basin in northwest Colorado.

The subterranean deposits of trona ore consist primarily (80-95 wt. %) of sodium sesquicarbonate ($Na_2CO_3 \cdot NaHCO_3 \cdot 2H_2O$) and contain lesser amounts of sodium chloride (NaCl), sodium sulfate ($Na_2SO_4$), organic matter, and insolubles such as clay and shales.

Trona ore may be recovered from subterranean trona ore deposits, for further processing in surface operations into soda ash or other alkali products, by mechanical mining techniques or by various solution mining methods. The Green River trona ore deposits are presently being commercially mined both by mechanical mining and by solution mining processes. The Piceance Creek nahcolite ore deposits are being mined by solution mining techniques.

Soda ash production facilities recovering soda ash from trona ore deposits are operated by a number of different organizations in the Green River region of southwestern Wyoming, including FMC Corporation (the assignee of this patent application), Solvay Chemicals, Inc., Tata Chemicals North America and OCI Wyoming LP.

Mechanical mining, also called dry mining, is carried out underground in the subterranean alkali ore beds by mining crews using complex machinery and includes room-and-pillar and long wall mining methods. Mechanical mining methods are relatively costly due to the upfront cost of sinking mine shafts and continuing need for mining manpower and complex mining machinery. In addition, such mechanical mining methods leave unrecovered a significant fraction of the trona ore in the beds being dry mined, e.g., about 60% unrecovered in room-and-pillar mining and about 30% in longwall mining.

Solution mining is an alternative mining approach for recovering minerals from subterranean ore deposits. Solution mining is sometimes referred to as in situ recovery or in situ leaching. Solution mining can be utilized either as an alternative to or as a supplement to mechanical mining, for the economical recovery of subterranean mineral ore values, such as in the recovery of alkali values from trona ore as soda ash.

Solution mining utilizes conventional well drilling technology and involves injecting water or other aqueous-based mining solvent, via a drilled well hole, into a subterranean deposit of trona ore (or other soluble mineral ore); allowing the mining solvent to dissolve soluble ore; pumping the resulting mining solution (mine water) via a drilled well hole to the surface; and processing the mine water to recover dissolved ore values from the solution as solid products, in the form of sodium carbonate or other related sodium-based chemicals. Solution mining methods may also be employed for recovering alkali values from depleted ore deposits that have previously been mechanically mined and abandoned.

Numerous solution mining methods are disclosed in the patent literature for recovery of trona and nahcolite ores, using surface-initiated well drilling techniques to inject a variety of aqueous mining solvents to solubilize the subterranean ore deposit and subsequently recover an alkaline mining solution from the solution-mined ore deposit.

Exemplary solution mining processes for trona are disclosed in U.S. Pat. No. 2,388,009 of Pike issued Oct. 30, 1945; U.S. Pat. No. 3,050,290 of Caldwell et al. (FMC) issued Aug. 21, 1962; U.S. Pat. No. 3,119,655 of Frint et al. (FMC) issued Jan. 28, 1964; U.S. Pat. No. 3,184,287 of Gancy (FMC) on May 18, 1965; U.S. Pat. No. 4,264,104 of Helvenston et al. (PPG) issued Apr. 28, 1981; U.S. Pat. No. 5,043,149 of Frint et al. (FMC) issued Aug. 27, 1991; and U.S. Pat. No. 5,192,164 of Frint et al. (FMC) issued Mar. 9, 1993.

Examples of solution mining procedures applicable to nahcolite ore are described in U.S. Pat. No. 3,779,602 of Beard et al. (Shell Oil) issued Dec. 18, 1973; U.S. Pat. No. 4,815,790 of Rosar et al. (NaTec) issued Mar. 28, 1989; U.S. Pat. No. 6,699,447 of Nielsen et al. (American Soda) issued Mar. 2, 2004; and U.S. Patent Application Publication No. 2009/0200854 A1 of Vinegar (Shell Oil) published Aug. 13, 2009.

An alkali solution from solution mining of a $NaHCO_3$-containing ore deposit such as trona or nahcolite typically contains dissolved sodium carbonate and sodium bicarbonate, as well as dissolved organic and inorganic impurities solubilized from the ore deposit. Alkali solutions containing $Na_2CO_3$ and $NaHCO_3$ values may be obtained not only via solution mining of $NaHCO_3$-containing subterranean ore deposits but also from surface alkali brine lakes or alkali waste ponds. The sodium carbonate values in such alkali solutions are normally recovered as soda ash by various crystallization processes, and the impurities present in the alkali solution are typically removed via a purge stream of crystallizer mother liquor, which is discarded.

Numerous processes have been described in the patent literature for treating aqueous alkali solutions obtained from solution mining or from surface lakes and ponds, to recover sodium carbonate and/or sodium bicarbonate from such alkali solutions. Many include a step of decomposing or neutralizing sodium bicarbonate in the aqueous alkali solution, a step that has the objective of increasing the sodium carbonate concentration and minimizing the sodium bicarbonate content, to facilitate crystallization of sodium carbonate, e.g., as sodium carbonate monohydrate, which can then be calcined to produce soda ash.

The following patents are exemplary of such prior art soda ash processes.

U.S. Pat. No. 4,869,882 of Dome et al. (General Chemical) issued Sep. 26, 1989 describes a process for recovering soda ash from waste or storage ponds associated with a soda ash manufacturing facility, via neutralization of the alkali waste water with lime to convert bicarbonate to carbonate, evaporation, and then crystallization of sodium carbonate decahydrate, which is recovered.

Surface processing operations for recovering soda ash from dry-mined trona ore and from alkali mining solutions obtained from trona solution mining are described in U.S. Pat. No. 5,262,134 of Frint et al. (FMC) issued Nov. 16, 1993.

Frint et al. '134 describes the recovery of sodium carbonate values from mining liquor obtained from solution mining of subterranean trona ore deposits, via sequential crystallizations of sodium sesquicarbonate and sodium carbonate decahydrate, the latter then being recrystallized as sodium carbonate monohydrate. The Frint '134 patent also contains descriptions of various prior art trona ore solution mining techniques, as well as descriptions of surface processing operations: the "sesquicarbonate" and "monohydrate" soda ash crystallization processes used for recovery of soda ash from dry-mined trona ore. Those disclosures of U.S. Pat. No. 5,262,134 are hereby incorporated by reference into the present specification.

Numerous soda ash recovery processes have been described in the patent literature for treating alkali solutions obtained from solution mining, and many include a step of decomposing sodium bicarbonate in the alkali solution, with the concurrent evolution of gaseous carbon dioxide, to covert the bicarbonate into sodium carbonate.

U.S. Pat. No. 5,283,054 of Copenhafer et al. (FMC) issued Feb. 1, 1994 describes a process for recovering sodium carbonate from aqueous mining solution obtained from solution mining of subterranean trona deposits. The process first converts sodium bicarbonate present in the aqueous mining solution to sodium carbonate, via evaporation and $CO_2$ stripping, followed by neutralization with lime to decompose residual sodium bicarbonate in the evaporated solution. An intermediate product, sodium carbonate decahydrate, is crystallized from the $NaHCO_3$-depleted solution and recovered, then redissolved and recrystallized as sodium carbonate monohydrate. The soda ash recovery process of the Copenhafer '054 patent is sometimes referred to as the Evaporation, Lime, Decahydrate, Monohydrate (ELDM) process.

Other soda ash recovery processes, analogous to the ELDM process, have been described in subsequent patents for recovery sodium carbonate values from alkali solutions.

U.S. Pat. No. 5,766,270 of Neuman et al. (Tg Soda Ash) issued Jun. 16, 1998 and U.S. Pat. No. 5,955,043 of Neuman et al. (Tg Soda Ash) issued Sep. 21, 1999 each describe processes for recovering sodium carbonate from dilute solution mining brines. In Neuman et al. '270, the sodium bicarbonate content of the mining brine is first lowered, via steam stripping, followed by crystallization of sodium carbonate decahydrate. In Neuman et al. '043, the bicarbonate content of the mining brine is first lowered, via neutralization with caustic soda or dilution, followed by crystallization of sodium carbonate decahydrate. Residual bicarbonate in the decahydrate mother liquor is removed via steam stripping.

Other patents and published patent applications (i) that describe soda ash recovery processes that utilize alkali solutions from solution mining or from dissolution of mined trona ore and (ii) that have a unit operation or step that involves conversion of bicarbonate to carbonate, e.g., via steam stripping, include U.S. Pat. No. 6,228,335 of Copenhafer et al. issued May 8, 2001; U.S. Pat. No. 6,576,206 of Copenhafer et al. issued Jun. 10, 2003; U.S. Pat. No. 6,589,497 of Smith issued Jul. 8, 2003; U.S. Pat. No. 7,645,435 of Braman et al. issued Jan. 12, 2010; and U.S. Patent Application Publication No. 2010/0066153 of Day et al. published Mar. 18, 2010.

Techniques for the removal of hydrogen sulfide from gas streams are described in many patents and in the technical literature. One of those techniques is the use of alkali carbonate or bicarbonate to remove hydrogen sulfide from gas streams containing both hydrogen sulfide and carbon dioxide, which is mentioned in the following patents.

U.S. Pat. No. 3,932,583 of Schievelbein issued Jan. 13, 1976 and U.S. Pat. No. 3,934,012 of Schievelbein issued Jan. 20, 1976 describe the preferential removal of hydrogen sulfide from a gas stream containing both hydrogen sulfide and carbon dioxide using an aqueous sodium bicarbonate solution.

U.S. Pat. No. 4,258,019 of Hiller et al. issued Mar. 24, 1981 describes a process for the selective removal at superatmospheric pressures of hydrogen sulfide from a gas stream containing both hydrogen sulfide and carbon dioxide using an aqueous alkali carbonate solution.

The present invention provides a method for removing hydrogen sulfide from a $CO_2$-containing gas stream from a soda ash production facility in a gas-liquid absorber apparatus by utilizing absorber alkali solution streams that are readily available in existing soda ash production facilities and that, unlike prior art procedures, do not require regeneration.

BRIEF SUMMARY OF THE INVENTION

In accordance with the present invention, hydrogen sulfide is removed from a carbon dioxide gas stream in a soda ash production facility in a method comprising introducing a $H_2S$-contaminated carbon dioxide gas stream from a carbon dioxide stripping unit operation in a soda ash production facility into a gas absorption apparatus for sequential contact of the gas stream with a first absorber alkali stream in a first absorber section and with a second absorber alkali stream in a second absorber section, wherein the first absorber alkali stream is an aqueous alkali waste stream containing at least 1 wt. % $Na_2CO_3$ and solubilized impurities from the soda ash production facility and is contacted with the $H_2S$-contaminated carbon dioxide gas stream in the first absorber section of the gas absorption apparatus in an amount sufficient to absorb a substantial amount of the $H_2S$ from the gas stream to produce a $H_2S$-depleted carbon dioxide gas stream and an absorber first effluent stream containing the absorbed $H_2S$, and wherein the second absorber alkali stream is an aqueous process stream containing at least 1 wt. % $Na_2CO_3$ from the soda ash production facility and is contacted with the $H_2S$-depleted carbon dioxide gas stream in the second absorber section of the gas absorption apparatus in an amount sufficient to absorb a substantial amount of the residual $H_2S$ in the $H_2S$-depleted carbon dioxide gas stream from the gas stream to produce a purified carbon dioxide gas stream and a second absorber effluent stream containing the absorbed residual $H_2S$;

withdrawing the first absorber effluent stream containing absorbed $H_2S$ and solubilized impurities from the first absorber section;

withdrawing the second absorber effluent stream containing absorbed residual $H_2S$ from the second absorber section and thereafter utilizing the second absorber effluent stream in the soda ash production facility, for further processing for recovery of its solubilized $Na_2CO_3$ values; and withdrawing the purified carbon dioxide gas stream from the gas absorption apparatus.

Another embodiment of the present invention is a method for removing hydrogen sulfide from a gas stream in a soda ash production facility comprising introducing a $H_2S$-contaminated gas stream in a soda ash production facility into a gas absorption apparatus for sequential contact of the gas stream with a first absorber alkali stream in a first absorber section and with a second absorber alkali stream in a second absorber section, wherein the first absorber alkali stream is an aqueous alkali waste stream containing at least 1 wt. % $Na_2CO_3$ and solubilized impurities from the soda ash production facility and is contacted with the $H_2S$-contaminated gas stream in the first absorber section of the gas absorption apparatus in an amount sufficient to absorb a substantial amount of the $H_2S$ from the gas stream to produce a $H_2S$-depleted gas stream and an absorber first effluent stream containing the absorbed $H_2S$, and wherein the second absorber alkali stream is an aqueous process stream containing at least 1 wt. % $Na_2CO_3$ from the soda ash production facility and is contacted with the $H_2S$-depleted gas stream in the second absorber section of the gas absorption apparatus in an amount sufficient to absorb a substantial amount of the residual $H_2S$ in the $H_2S$-depleted gas stream from the gas stream to produce a purified gas stream and a second absorber effluent stream containing the absorbed residual $H_2S$;

withdrawing the first absorber effluent stream containing absorbed $H_2S$ and solubilized impurities from the first absorber section;

withdrawing the second absorber effluent stream containing absorbed residual $H_2S$ from the second absorber section and thereafter utilizing the second absorber effluent stream in the soda ash production facility, for further processing for recovery of its solubilized $Na_2CO_3$ values; and withdrawing the purified gas stream from the gas absorption apparatus.

BRIEF DESCRIPTION OF THE FIGURE

The FIGURE is a schematic flow diagram illustrating a preferred embodiment of the invention, described in the Example, in which an absorber containing two absorption sections is utilized to remove hydrogen sulfide from a carbon dioxide gas stream in a soda ash production facility, using crystallizer purge liquor as the first absorber section absorber solution and solution mining aqueous liquor as the second absorber section absorber solution.

DETAILED DESCRIPTION OF THE INVENTION

Overview of Invention

The method of the present invention removes hydrogen sulfide that is present as a contaminant in a gas stream, preferably a carbon dioxide gas stream, that is generated in or otherwise available in a soda ash production facility, using a gas-liquid absorption device that utilizes aqueous alkali solution streams that are readily available in a soda ash production facility. A unique advantage of the invention is that the spent aqueous absorbent alkali solution streams are not regenerated and do not impose additional economic cost burdens on the soda ash production facility.

In the context of the present invention, the term soda ash production facility is broadly defined and should be understood to cover production facilities that recover alkali values as soda ash (sodium carbonate), sodium bicarbonate, or other related sodium mineral products (1) from natural deposits of alkali mineral ores such as trona, nahcolite, wegscheiderite, natron or other $NaHCO_3$-containing mineral ores or (2) from natural or man-made alkali lakes containing sodium carbonate ($Na_2CO_3$), sodium bicarbonate ($NaHCO_3$), or both, as well as other inorganic salts, e.g., sodium chloride, sodium sulfate, and the like. Such alkali mineral recovery operations may involve mechanical mining (including beneficiation of the recovered mineral ore) or solution mining or both, for recovery of alkali values from subterranean ore deposits of the $NaHCO_3$-containing mineral ores.

The method of the present invention involves absorption of hydrogen sulfide from a $H_2S$-contaminated gas stream, e.g., a $H_2S$-contaminated carbon dioxide gas stream, using a gas-liquid absorption apparatus that comprises two absorption sections or segments, a first section in which the majority of the hydrogen sulfide is removed and a second section in which residual hydrogen sulfide is removed to produce a purified, $H_2S$-depleted gas stream that may be vented into the atmosphere.

The first absorption section utilizes an aqueous alkali solution as the liquid absorbent that is a diverted portion of a waste stream within the soda ash production facility, an aqueous alkali waste stream that has little economic value and that is normally discarded, e.g., into a waste holding pond. The aqueous alkali solution waste stream used in the first absorber section is preferably a crystallizer mother liquor purge stream, which functions in the absorber to remove the majority of the hydrogen sulfide from $H_2S$-contaminated gas stream. The spent absorber effluent withdrawn from the first section of the absorption apparatus is normally directed to the same waste holding pond which would otherwise be the intended destination of the crystallizer liquor purge stream, if the latter were not used in the inventive absorption method.

The second absorption section utilizes an aqueous alkali solution that is a diverted portion of a valuable process stream used for recovery of its solubilized $Na_2CO_3$ values in the soda ash production facility. The second absorption section functions as a "polishing step," to remove a relatively small amount of residual hydrogen sulfide from $H_2S$-depleted gas stream. The spent absorber effluent withdrawn from the second section of the absorption apparatus therefore has a composition that contains only a small amount of solubilized hydrogen sulfide. As such, the spent absorber effluent withdrawn from the second section of the absorption apparatus is not devalued and is readily usable for the same purpose as was originally intended for the source aqueous alkali solution process stream, i.e., recovery of its solubilized $Na_2CO_3$ values in the soda ash production facility.

As is readily apparent from this summary description of the invention, the hydrogen sulfide absorption method of this invention provides several noteworthy advantages and benefits, in comparison with conventional absorption procedures described in the prior art for removing hydrogen sulfide from $H_2S$-containing gas streams.

There is no need or requirement for regeneration of the spent absorber effluent solutions. The spent absorber effluent solutions do not need to be treated to remove their absorbed hydrogen sulfide, as in prior art procedures where such regenerated solution is recycled to the absorber for reuse.

The absorber alkali solutions utilized in the present invention are readily available resources within a soda ash production facility, as waste alkali solution streams and as valuable alkali solution process streams. They are not required to be especially prepared for use as absorber liquid absorbent streams for use in the absorption apparatus.

The method of the present invention nevertheless provides an efficient and highly effective method for removing hydrogen sulfide that may contaminate gas streams in a soda ash facility, particularly $H_2S$-contaminated carbon dioxide gas streams generated during the production of soda ash in a soda ash facility, as is described in more detail in the discussion which follows.

Technical Problem

Impurities in aqueous alkali solutions obtained from dissolution of alkali minerals such as trona and nahcolite ores (either mechanically-mined ore or solution-mined ore) are inevitably present, given that the ores contain various minor components normally considered to be impurities, e.g., sulfate and chloride salts and organic components in the case of trona ore that become solubilized along with sodium carbonate and sodium bicarbonate from the ore's sodium sesquicarbonate component.

A traditional approach for dealing with such solubilized impurities in aqueous alkali solutions, in crystallization-based soda ash recovery processes that crystallize sodium carbonate monohydrate or sodium carbonate decahydrate, is to purge a portion of the crystallizer mother liquor to prevent the accumulation of impurities in recycled crystallizer mother liquor.

The presence of soluble sulfide as an additional impurity in aqueous alkali solutions adds a complicating factor in the subsequent processing of such solutions. Many soda ash recovery processes that utilize $Na_2CO_3$- and $NaHCO_3$-containing alkali solutions require the conversion of bicarbonate to carbonate, e.g., via heating or steam stripping or evaporation, to facilitate the downstream crystallization of the desired $Na_2CO_3$ species, e.g., sodium carbonate monohydrate or sodium carbonate decahydrate.

Decomposition of solubilized sodium bicarbonate to sodium carbonate in the $Na_2CO_3$- and $NaHCO_3$-containing alkali solutions is typically carried out in a carbon dioxide stripping unit operation via heating or steam stripping or evaporation. The carbon dioxide stripping unit operation results in decomposition of soluble $NaHCO_3$ in the aqueous alkali solution to form soluble $Na_2CO_3$ as well as gaseous byproducts, carbon dioxide and water. The gaseous $CO_2$ and $H_2O$ byproducts form a carbon dioxide-rich gas stream that exits the carbon dioxide stripping unit operation.

The presence of even minor concentrations of soluble sulfide in the $Na_2CO_3$— and $NaHCO_3$-containing alkali solutions being subjected to decomposition of soluble $NaHCO_3$ also results in the concurrent evolution and release of the soluble sulfide as gaseous hydrogen sulfide ($H_2S$), an undesirable gaseous byproduct that contaminates the $CO_2$-rich gas stream. Gaseous hydrogen sulfide is considered an air pollutant, even at relatively low concentrations. The $H_2S$-contaminated $CO_2$-rich gas stream must normally be treated to remove the gaseous hydrogen sulfide contaminant regardless of whether the carbon dioxide-rich gas stream is released into the atmosphere or is utilized further for its $CO_2$ content.

Hydrogen sulfide is a colorless gas that is well-known for its characteristic "rotten eggs" odor, which is detectable even at very low concentrations, e.g., 1 ppm (volume) $H_2S$ or less. Hydrogen sulfide at high concentrations, usually associated with accidental releases, is poisonous and can be lethal. At low $H_2S$ concentrations, there may be adverse health effects from long-term exposure. Although there is no federal ambient air quality standard for hydrogen sulfide, many states in the U.S. have air quality regulations for hydrogen sulfide levels.

Traditional prior art processes treat $H_2S$-contaminated gas streams by removal of the contaminant via wet scrubbing in a gas absorption column (also called a gas scrubber) using a liquid absorption medium containing a alkaline reactant (e.g., sodium hydroxide or particulate lime in suspension) or dry scrubbing using a particulate solid as the reagent. These gas scrubbing techniques typically react the reagent with the gaseous $H_2S$ to form a sulfite or sulfate byproduct. Obvious drawbacks to this sulfide control approach, involving removal of gaseous hydrogen sulfide from high volume gas streams, are the high capital cost and raw materials (reagent) cost.

The sulfide content of the sulfide-containing aqueous alkaline solutions treated according to this invention may originate from a variety of different sources. Aqueous alkaline solutions obtained from subterranean environments often contain sulfide that originates from microbial activity.

Sulfides, including hydrogen sulfide and sulfide salts, are believed to be formed in subterranean aqueous environments that are in contact with sulfate-containing ores (or petroleum deposits) by the activity of sulfate- or sulfur-reducing microorganisms, particularly anaerobic bacteria, which are naturally present in water and soil. Such aqueous environments are frequently encountered in recovery of alkali minerals. For example, the solution mining of trona or nahcolite ores with aqueous mining solvents injected into the ore deposits (which normally contain soluble sulfates as impurities) produces aqueous alkali solutions containing $Na_2CO_3$ and $NaHCO_3$ as well as other solubilized impurities, including sulfides.

Particularly problematic microorganisms are believed to be *Desulfovibrio* and *Desulfotomaculum* bacterial species, which convert sulfur or sulfates present in such (largely anaerobic) aqueous environments into sulfides, e.g., hydrogen sulfide at acidic pH levels. These gram negative bacteria include *Desulfovibrio* species like *Desulfovibrio desulfuricans* and *Desulfovibrio salexigens*, and *Desulfotomaculum* species like *Desulfotomaculum nigrificans*. Such bacteria not only require a sulfur source to remain active, but also a carbon source, which is provided by the bicarbonate and carbonate which is present in trona or nahcolite ore deposits.

Sulfate-reducing bacteria are normally sessile bacteria, i.e., they attach themselves to solid surfaces, as opposed to being free-floating in the aqueous fluid. In addition, sulfate-reducing bacteria are generally found in combination with slime-forming bacteria, in films consisting of a biopolymer matrix embedded with bacteria. The interior of these biofilms is anaerobic, which is highly conducive to the growth of sulfate-reducing bacteria even if the surrounding environment is aerobic. As such, these problematic bacteria are difficult to control with biocides that may be conventionally added to the aqueous medium that is injected into a solution-mined subterranean ore deposit to form an alkali solution for recovery.

Consequently, soluble sulfide formation in aqueous alkali solutions is not easily or economically treated via introduction of biocides into the aqueous mining solvent, which is injected in very large volumes into the subterranean ore deposit and tends to remain in the ore deposit cavity for long periods of time before the resultant alkali solution is withdrawn from the cavity. Aqueous alkali mining solutions that withdrawn from solution-mined subterranean ore deposits are therefore likely to be contaminated with soluble sulfides, which can become volatilized as gaseous hydrogen sulfide once the withdrawn aqueous alkali mining solution is exposed to the atmosphere or during soda ash processing operations that are carried out on such solutions on the surface.

H$_2$S-Contaminated Gas Streams, Including Carbon Dioxide-Rich Gas Streams

A preferred embodiment of the present invention is directed to the treatment of H$_2$S-contaminated carbon dioxide-rich gas streams that are formed during the processing of Na$_2$CO$_3$- and NaHCO$_3$-containing aqueous alkali solutions in a soda ash production facility. As mentioned above, under Technical Problem, such carbon dioxide-rich gas streams are often contaminated by the presence of hydrogen sulfide, in relatively low but significant concentrations, which is volatized from the aqueous alkali solutions being subjected to a carbon dioxide stripping unit operation.

A primary source of H$_2$S-contaminated carbon dioxide-rich gas streams in a soda ash production facility is such gas streams that originate during operation of a carbon dioxide stripping unit operation, usually accomplished or carried out or otherwise effected via heating or steam stripping or evaporation of sulfide-contaminated Na$_2$CO$_3$- and NaHCO$_3$-containing alkali solutions. The carbon dioxide stripping unit operation results in decomposition of soluble NaHCO$_3$ to form soluble Na$_2$CO$_3$, according to a chemical reaction that may be shown in simplified form as $$2NaHCO_3 \rightarrow Na_2CO_3 + CO_2(g) + H_2O(g) \tag{1}$$

As shown by the reaction, the carbon dioxide stripping unit operation results in decomposition of soluble NaHCO$_3$ in the aqueous alkali solution to form soluble Na$_2$CO$_3$ as well as gaseous byproducts, carbon dioxide and water. Only a portion of the generated water byproduct remains solubilized in the aqueous alkali solution being stripped. The gaseous CO$_2$ and H$_2$O byproducts of the NaHCO$_3$ decomposition reaction result in formation of a carbon dioxide-rich gas stream that exits the carbon dioxide stripping unit operation. The CO$_2$-rich gas stream is also humidified by the presence of water.

The carbon dioxide stripping unit operation is well known in the field of soda ash production, particularly in the context of the Evaporation-Lime-Decahydrate-Monohydrate (ELDM) process and analogous soda ash processes which have been mentioned above in the Background section. U.S. Pat. No. 5,283,054 of Copenhafer et al. (FMC) issued Feb. 1, 1994 describes the so-called ELDM process for recovering sodium carbonate (soda ash) from aqueous mining solution obtained from solution mining of subterranean trona deposits, by the steps of first converting sodium bicarbonate present in the aqueous mining solution to sodium carbonate, via evaporation and CO$_2$ stripping, followed by neutralizing with lime to decompose residual sodium bicarbonate in the evaporated solution. In the final steps of the ELDM process, an intermediate product, sodium carbonate decahydrate, is crystallized from the NaHCO$_3$-depleted solution and recovered, then redissolved and recrystallized as sodium carbonate monohydrate. U.S. Pat. No. 5,283,054 of Copenhafer is hereby incorporated by reference for its disclosures relating to the carbon dioxide stripping operation in the ELDM soda ash production process.

The presence of even minor concentrations of soluble sulfide (HS$^{-1}$ or S$^{-2}$) in the Na$_2$CO$_3$- and NaHCO$_3$-containing alkali solutions being subjected to NaHCO$_3$ decomposition in a carbon dioxide stripping unit operation also results in the concurrent evolution and release of the soluble sulfide as gaseous hydrogen sulfide (H$_2$S), an undesirable gaseous byproduct that contaminates the CO$_2$-rich gas stream.

Gas streams that contain carbon dioxide and that are also contaminated with H$_2$S may originate at other points or locations in a soda ash production facility, and such H$_2$S-contaminated CO$_2$-containing gas streams may also be treated in the method of this invention, to remove the hydrogen sulfide. Such H$_2$S-contaminated CO$_2$-containing gas streams may be generated or originate (1) in evaporative crystallization unit operations carried out to recover sodium carbonate monohydrate in a soda ash facility, (2) in CO$_2$ absorber operations associated with the production of sodium bicarbonate in a soda ash production facility, (3) in gas streams vented or exhausted from solution mining operations associated with the recovery of alkali values from a NaHCO$_3$-containing subterranean ore deposit adjacent to a soda ash production facility, or the like.

The H$_2$S-contaminated carbon dioxide gas streams treated in the method of this invention contain significant concentrations of carbon dioxide and such streams may also be referred to as H$_2$S-contaminated carbon dioxide-rich (or CO$_2$-rich) gas streams in description in the present specification. For purposes of this disclosure, the terms "H$_2$S-contaminated carbon dioxide gas streams," "H$_2$S-contaminated carbon dioxide-rich gas streams," and "H$_2$S-contaminated CO$_2$-rich gas streams" should be understood to refer to gas streams containing a substantial concentration or significant concentration of carbon dioxide.

In the context of the present disclosure, a "substantial concentration" or "significant concentration" of carbon dioxide with reference to the carbon dioxide (or CO$_2$-rich) gas streams treated according to the present invention is at least about 20 vol. % CO$_2$. The H$_2$S-contaminated carbon dioxide gas streams treated in the method of this invention preferably contain at least about 30 vol. % CO$_2$ and more preferably contain at least about 50 vol. % CO$_2$.

These carbon dioxide concentrations are applicable to carbon dioxide gas streams that have been dehumidified and contain less than about 30 vol. % water vapor. For example, carbon dioxide gas streams from carbon stripping unit operations that are carried out via steam stripping will typically be highly humidified, so the carbon dioxide concentration in the humidified gas stream will be diluted by the presence of the significant amounts of water vapor. Such water vapor is often routinely removed by condensation or the like, e.g., to less than about 30 vol. % water, before the carbon dioxide gas stream is subjected to further processing in soda ash production facilities.

The method of the present invention is also applicable to other gas streams that are generated or originated or are otherwise available in a soda ash production facility, where such gas streams do not contain carbon dioxide but that are nevertheless contaminated with H$_2$S. Such H$_2$S-contaminated gas streams may be generated or originate or otherwise be available or present in a soda ash production facility. Examples include, without limitation, (1) H$_2$S-contaminated air or water-containing H$_2$S-contaminated gas streams may be generated or originate in the various unit operations carried out in a soda ash production facility or (2) H$_2$S-containing air or gas streams, particularly methane-containing gas streams, vented or exhausted from solution mining operations or from mechanical mining operations or during recovery of mineral or petroleum products adjacent to a soda ash production facility.

The H$_2$S-contaminated carbon dioxide gas streams or other H$_2$S-contaminated gas streams treated in the method of this invention may contain a range of concentrations of hydrogen sulfide that contaminate the gas stream, from low but significant concentrations to moderate to high H$_2$S concentrations. Hydrogen sulfide concentrations in the H$_2$S-contaminated carbon dioxide gas streams may be significant, e.g., at least 0.1 vol. % H$_2$S (1000 ppmv H$_2$S) or at least 0.5 vol. % H$_2$S (5000 ppmv H$_2$S), or even at least 1 vol. % H$_2$S (10,000 ppmv H$_2$S). Lower hydrogen sulfide concentrations can also be problematic in the H$_2$S-contaminated carbon dioxide gas streams. e.g., at least 500 ppmv H$_2$S, or as low as at least 300 ppmv H$_2$S or even as low as at least 100 ppmv H$_2$S. These wide ranges of hydrogen sulfide concentrations in H$_2$S-contaminated gas streams are readily treated in the method of this invention.

The above-noted concentration levels of hydrogen sulfide in H$_2$S-contaminated carbon dioxide gas streams or in other H$_2$S-contaminated gas streams may be effectively treated in the method of this invention and reduced to significantly lower concentrations, such that the treated gas streams may be released into the atmosphere or otherwise utilized in a soda ash production facility, without need for further H$_2$S removal treatment steps. Hydrogen sulfide removal efficiencies are discussed in more detail below, under Purified Gas Stream—H$_2$S Removal Efficiencies.

First and Second Absorber Alkali Solutions—Common Characteristics

The present invention utilizes two aqueous alkali solution streams having distinctly different compositions that make the respective first and second alkali solution streams particularly well suited for their use in the gas-liquid absorption method of this invention, for treating H$_2$S-contaminated gas streams in a soda ash production facility.

The two aqueous alkali solution streams used as liquid absorbents in this invention share several common noteworthy characteristics, in addition to the individually unique characteristics that are discussed further below under the sub-headings, First Absorber Section Alkali Solution and Second Absorber Section Alkali Solution.

First of all, the aqueous solutions that are suitable for use as absorber alkali solution streams according to this invention are characterized by being aqueous alkali solutions that have an alkaline pH value, i.e., a pH value in excess of 7, typically in the range of in excess of pH 7 up to about pH 12, preferably about pH 8 to about pH 11.

Secondly, the aqueous alkali solutions utilized as absorber alkali solution streams in the present invention are aqueous solutions containing (i) dissolved sodium carbonate or (ii) dissolved sodium carbonate along with dissolved sodium bicarbonate. The carbonate content, including carbonate with bicarbonate optionally being present, comprises the alkali of the aqueous alkali solutions.

Such aqueous alkali solutions are further characterized by being readily available in existing soda ash production facilities, at a number of different points or sources within those facilities. Combinations of aqueous alkali solution streams from two or more sources may also be used.

The solubilized sodium carbonate content of the aqueous alkali solutions utilized as absorber alkali solution streams is appreciable and is preferably significant, so as to promote efficient absorption of hydrogen sulfide from the H$_2$S-contaminated gas streams being treated in the present invention. The sodium carbonate content of these aqueous alkali solutions contains at least 1 wt. % Na$_2$CO$_3$, preferably at least about 5 wt. % Na$_2$CO$_3$ and, more preferably, at least about 7 wt. % Na$_2$CO$_3$ and most preferably at least about 10 wt. % Na$_2$CO$_3$. (These and other weight percentages in this specification applicable to solutions should be understood to mean percentage by weight, based on the total weight of the solution.)

The aqueous alkali solutions utilized as absorber alkali solution streams in the present invention contain solubilized sodium carbonate and will usually also contain solubilized sodium bicarbonate, the latter typically being present in relatively small concentrations, as compared to the sodium carbonate. In aqueous alkali solutions utilized as absorber alkali solution streams, the sodium bicarbonate concentration in such alkali solution streams is less than the counterpart sodium carbonate concentration. The sodium bicarbonate concentration in such alkali solution streams is preferably present in concentrations of less than about 5% NaHCO$_3$, more preferably, less than about 4 wt. % NaHCO$_3$ and, most preferably, less than about 3 wt. % NaHCO$_3$.

Alkali solutions containing high Na$_2$CO$_3$ concentrations, i.e., at least about 10 wt. % Na$_2$CO$_3$ up to a saturation concentration of Na$_2$CO$_3$, are highly preferred, since such high alkali concentrations promote good absorption recovery efficiencies in the absorption of hydrogen sulfide from H$_2$S-contaminated carbon dioxide gas streams.

While not wishing to be bound by any particular mechanism of action or reaction scheme, the inventor nevertheless believes that the sodium carbonate (Na$_2$CO$_3$) content of alkali solutions containing significant or high Na$_2$CO$_3$ concentrations is advantageous for the absorptive removal of H$_2$S from the H$_2$S-contaminated gas stream into the alkali absorption solution. The sodium carbonate in the alkali absorption solution is believed to react with the absorbed hydrogen sulfide, as follows:

$$\mathrm{Na_2CO_3 + H_2S \rightarrow NaHCO_3 + NaHS} \qquad (2)$$

Sodium sulfate that is often present in the first absorber section alkali solution as an impurity is also believed to react with absorbed hydrogen sulfide, as follows:

$$\mathrm{Na_2SO_4 + H_2S \rightarrow NaHSO_4 + NaHS} \qquad (3)$$

The aqueous alkali solutions employed as absorber alkali solutions in this invention preferably have a total alkali (T.A.) content, determined from their dissolved sodium carbonate and sodium bicarbonate contents, of at least about 6 wt. % T.A. More preferably, the aqueous alkali solutions have a total alkali content of at least about 8 wt. %, and, most preferably, at least about 10 wt. % T.A.

The term total alkali (or T.A.) refers to the total weight percent in an aqueous alkali solution of its dissolved sodium carbonate and sodium bicarbonate, the sodium bicarbonate being expressed as its equivalent sodium carbonate content: Percent total alkali (T.A. wt. %)=Na$_2$CO$_3$ (wt. %)+[53/84]×[NaHCO$_3$ (wt. %)]. For example, an aqueous alkali solution containing 13 wt. % Na$_2$CO$_3$ and 4 wt. % NaHCO$_3$ would have a total alkali content of 15.5 wt. % Na$_2$CO$_3$, since 4 wt. % NaHCO$_3$ corresponds to 2.5 wt. % equivalent Na$_2$CO$_3$, the conversion factor for the sodium bicarbonate content being [(½)×106 mol. wt. Na$_2$CO$_3$/84 mol. wt. NaHCO$_3$].

Concerning total alkali, it should be noted that solubilized salts other than carbonate and bicarbonate, e.g., sodium sulfate and other sulfur salts and sodium chloride, are not considered to be components that contribute to the "total alkali" content of an aqueous alkali solution.

First Absorber Section Alkali Solution

The aqueous alkali solutions utilized as first absorber alkali solution streams, in the first section of the gas-liquid absorption apparatus in the present invention, are aqueous alkali solutions in a soda ash facility that normally are considered waste streams. Such aqueous alkali solution waste streams typically contain appreciable and preferably significant concentrations of sodium carbonate and lesser concentrations of sodium bicarbonate. These aqueous alkali solution waste streams also contain significant concentrations of solubilized impurities, e.g., sodium sulfate ($Na_2SO_4$) and sodium chloride (NaCl) being most commonly present.

The aqueous alkali solutions utilized as first absorber alkali solution streams are characterized by containing (i) an appreciable concentration of soluble sodium carbonate, at least 1 wt. % $Na_2CO_3$, preferably at least about 5 wt. % $Na_2CO_3$, more preferably at least about 7 wt. % $Na_2CO_3$, and most preferably at least about 10 wt. % $Na_2CO_3$ and (ii) relatively high impurities levels, at concentrations of at least about 1 wt. % impurities, typically at least about 3 wt. % impurities, and sometimes at least about 5 wt. % impurities, or higher.

The appreciable or high impurity levels in such aqueous alkali solutions make further processing of such solutions, e.g., to recover their dissolved $Na_2CO_3$ and $NaHCO_3$ values, economically unattractive or unfeasible, so such aqueous alkali solutions are considered waste streams and are typically directed to or collected in holding ponds in the vicinity of the soda ash production facility.

These aqueous alkali solutions waste streams, containing high levels of impurities, may originate from any of several sources or unit operations within the soda ash production facility, including purge streams from crystallizer unit operations or from waste streams or holding ponds that are associated with mechanical mining or solution mining operations. Combinations of waste streams from two or more sources may also be used.

Preferred sources of suitable aqueous alkali solutions waste streams include purge streams of aqueous alkali crystallizer mother liquor, which are withdrawn from continuously-operated crystallizers to prevent the level of impurities present in the crystallizer liquor from accumulating to concentrations that interfere with the crystal formation, habit or purity of the sodium carbonate species being crystallized. Purge streams of aqueous alkali crystallizer liquor suitable for use as the first absorber aqueous alkali stream in this invention include purge streams from crystallization operations that produce sodium carbonate monohydrate or sodium carbonate decahydrate. Purge streams from crystallization operations that produce sodium sesquicarbonate or even sodium bicarbonate may also be used; such sesquicarbonate crystallizer liquors are often characterized by containing relatively high sodium bicarbonate concentrations and therefore are less preferred for use as the first absorber alkali solution stream.

Purge streams from crystallizer operations vary in composition according to the crystalline species being recovered, as well as the crystallizer operating parameters employed. For example, a purge stream from a sodium carbonate monohydrate crystallizer operation may contain, e.g., 19-30 wt. % sodium carbonate, 0.1-0.4 wt. % sodium bicarbonate, up to 2.7 wt. % NaCl, up to 2.4 wt. % $Na_2SO_4$ and 100-1500 ppm total organic carbon (TOC). A purge stream from a sodium sesquicarbonate crystallizer operation may contain, e.g., 3-25 wt. % sodium carbonate, 1-15 wt. % sodium bicarbonate, and similar levels to the monohydrate crystallizer purge of chloride, sulfate and organics. A purge stream from a sodium carbonate decahydrate crystallizer operation may contain, e.g., 7-10 wt. % sodium carbonate, 1-4 wt. % sodium bicarbonate, 4-12 wt. % NaCl, 1-3 wt. % $Na_2SO_4$ and 100-1500 ppm total organic carbon (TOC).

Other sources of aqueous alkali solutions containing high levels of impurities, suitable for use as the first absorber aqueous alkali solution stream in this invention, include (1) waste or holding ponds employed in conjunction with surface operations for soda ash manufacturing, e.g., alkali-containing ponds that hold soda ash process waste streams, e.g., mother liquor purged from soda ash crystallization operations, or other aqueous waste or byproduct streams from soda ash manufacturing, or (2) waste water streams or waste water ponds containing (a) waste water recovered or pumped from the subterranean location of conventional mechanical mining operations, e.g., dust suppression water or cooling water, or (b) waste water recovered from solution mining operations, both (a) and (b) being referred to herein as mining waste water, e.g., trona mining waste water. These aqueous alkali solutions typically contain significant levels of inorganic impurities, e.g., chloride, sulfate, sulfide and organic impurities, as compared with alkali solutions obtained directly from solution mining operations.

Still another source of aqueous alkali solutions containing high levels of impurities, suitable for use as the first absorber aqueous alkali solution stream in this invention, is impure alkaline solutions (brines) that are obtained from naturally-occurring surface brine lakes or surface alkali lakes, e.g., Searles Lake, Owens Lake or Mono Lake in California. These naturally-occurring aqueous alkali solutions, referred to herein as impure natural alkaline lake brines, typically contain significant levels of impurities, e.g., sodium sulfate and sodium chloride, which require additional often-complex processing steps for their removal prior to recovery of sodium carbonate species from such solutions.

After the first absorber aqueous alkali solution stream is employed in the first section of the absorber, in the method of this invention, the first absorber effluent stream containing absorbed $H_2S$ is withdrawn from the first absorber section. A portion of the effluent solution from the first absorber section may optionally be recycled to the absorber section, to reduce its alkaline solution demand, i.e., to reduce the volume of absorber solution needed to be introduced to the first absorber section to achieve the desired removal of hydrogen sulfide from the carbon dioxide gas stream in that section.

In the method of this invention, the first absorber effluent stream containing absorbed $H_2S$ that is withdrawn from the first absorber section is not regenerated, to remove its absorbed hydrogen sulfide, e.g., so the regenerated solution may be re-used in the absorption unit operation. This represents a significant economic benefit, as compared with prior art absorption procedures that require an absorber effluent regeneration step or other step to prepare fresh absorber solution for use in the absorber.

The impurities levels in the first absorber effluent stream withdrawn from the first absorber section may be higher than those in the first absorber aqueous alkali solution stream introduced into the first absorber section, since absorption of the hydrogen sulfide from the $H_2S$-contaminated carbon dioxide gas stream typically results in higher levels of dissolved sulfide in the effluent stream from this absorber section. Some dilution of the impurities concentrations in the effluent stream may occur because of condensation of water vapor into the spent absorber effluent solution (such water being condensed from the $H_2S$-contaminated carbon dioxide gas stream being treated) in this absorber section.

The first absorber effluent stream is preferably directed to a waste holding pond for its disposal. The waste holding pond may be the same or different from the holding pond into which the purge stream utilized for the first absorber aqueous alkali solution stream would have otherwise been directed. Alternatively, the first absorber effluent stream may be directed to an underground cavity into which impure aqueous waste streams are being directed, e.g., a worked out section of a mechanically-mined ore deposit that is safely separated from the working mine operations.

This disposition of the first absorber effluent stream represents no significant economic cost, since the alkali solution source of the first absorber aqueous alkali solution stream would also have not otherwise been utilized to recover dissolved $Na_2CO_3$ and $NaHCO_3$ values, because of its high impurities content.

The hydrogen sulfide absorbed into first absorber effluent stream that is directed to a waste alkali holding pond normally does not present a pollution problem, once the spent first absorber effluent stream is added to the waste holding pond that already contains accumulated waste liquor from operations at the soda ash production facility.

The hydrogen sulfide in the first absorber effluent stream introduced into the waste holding pond does not present a pollution problem from volatilized $H_2S$ since (i) the concentration of dissolved hydrogen sulfide in the alkali waste solution is relatively low and (ii) a portion of the dissolved sulfide in the holding pond liquor becomes oxidized to sulfate by exposure of the waste pond liquor to air, and this natural reaction is usually catalyzed via the presence of iron and other metallic impurities in the alkaline waste liquor.

Second Absorber Section Alkali Solution

The aqueous alkali solutions utilized as second absorber alkali solution streams, in the second section of the gas-liquid absorber in the present invention, are aqueous alkali solutions in a soda ash facility that are process streams that are subsequently processed to recover their dissolved sodium carbonate values as soda ash. These aqueous alkali solutions are typically considered to be valuable or useful process streams, since they are utilized in the soda ash production facility for recovery of their soluble sodium carbonate values, in contrast to the impurities-containing alkali solution waste streams that are employed for use as the first absorber alkali solution streams.

The aqueous alkali solutions utilized as second absorber alkali solution streams may be obtained from any of several process stream sources that are associated, directly or indirectly, with the recovery of their dissolved sodium carbonate values as soda ash in a soda ash production facility. The soda ash production facility may be located at a site where soda ash is recovered from natural mineral ore deposits, by mechanical mining or solution mining or both, or from alkaline lake brine sources.

The aqueous alkali solutions utilized as second absorber alkali solution streams are characterized by containing (i) an appreciable concentration of soluble sodium carbonate, at least 1 wt. % $Na_2CO_3$, preferably at least about 5 wt. % $Na_2CO_3$, more preferably at least about 7 wt. % $Na_2CO_3$, and most preferably at least about 10 wt. % $Na_2CO_3$ and (ii) relatively low impurities levels (in contrast to the impurities-containing solutions employed in the first absorber section.) Such aqueous alkali solutions may also contain sodium bicarbonate, in concentrations smaller than those of the soluble sodium carbonate component, as was noted above.

These characteristics facilitate the use of such aqueous alkali solutions as process or feed streams for production and recovery of soda ash, e.g., via crystallization of a desired sodium carbonate species such as sodium carbonate monohydrate, sodium carbonate decahydrate or sodium sesqui-carbonate or even sodium bicarbonate (which may be calcined to form an anhydrous soda ash).

The aqueous alkali solutions utilized as the second absorber section aqueous alkali solution stream in this invention may be obtained directly from (or indirectly derived from) subterranean alkali mineral ore deposits (i) that contain $NaHCO_3$- and $Na_2CO_3$-bearing minerals, e.g., trona (primarily sodium sesquicarbonate, $Na_2CO_3 \cdot NaHCO_3 \cdot 2H_2O$), such as the deposits located in the Green River Basin of southwest Wyoming, wegscheiderite (primarily $Na_2CO_3 \cdot 3NaHCO_3$), or (ii) that contain primarily $NaHCO_3$, e.g., nahcolite (primarily $NaHCO_3$), such the deposits as located in the Piceance Creek Basin in northwest Colorado. Combinations of these $NaHCO_3$- and $Na_2CO_3$-containing minerals may be present in the same deposit or formation.

The aqueous alkali solutions may be obtained from mechanical mining (from dissolution of dry-mined ore into an aqueous medium) or from solution mining of subterranean ore deposits or from solution mining of previously-mined (mechanical (dry) mining) ore deposits.

Exemplary and preferred aqueous alkali solutions utilized as second absorber alkali solution streams are (1) aqueous alkali mining solutions that are recovered from solution mining of trona, nahcolite or other $NaHCO_3$-containing mineral ores and (2) crystallizer feed stream solutions, used to crystallize sodium carbonate monohydrate, sodium carbonate decahydrate, sodium sesquicarbonate or sodium bicarbonate.

Preferred solution mining liquors that are employed as absorbent streams in the second absorber section in the present invention are those aqueous alkali mining solutions obtained from solution mining of subterranean trona ore deposits or other $NaHCO_3$-containing ore deposits, using solution mining solvents (e.g., water or recycled aqueous streams dilute in dissolved alkali values) and solution mining techniques that are well known in the alkali solution mining art.

Solution mining liquor streams obtained from solution mining of trona will typically contain about 13 wt. % $Na_2CO_3$ and about 4.5 wt. % $NaHCO_3$, corresponding to a total alkali content of about 16%. Such solution-mined aqueous alkali streams are typically utilized, either alone or in combination with other alkali process streams available within soda ash production facility, as a solution feed to a sodium carbonate crystallization operation.

For trona ore deposits located in Green River, Wyo., the temperature of such subterranean trona deposits typically is within the range of about 68° F. to about 86° F., and the temperature of alkali solution mining streams recovered from solution mining of such deposits will likely be close to these temperatures.

Aqueous alkali solutions recovered from solution mining of trona ore or other $NaHCO_3$-containing ore with water or a dilute aqueous alkali mining solvent are normally not completely saturated, as compared to the theoretical equilibrated saturation concentration obtainable under laboratory conditions. For example, aqueous alkali solutions that are essentially equilibrated, saturated solutions (with respect to $NaHCO_3$ and $Na_2CO_3$) and that are obtained from the dissolution of sodium sesquicarbonate in trona ore using an aqueous medium such as water at 68° F. in a laboratory environment will contain about 17 wt. % $Na_2CO_3$ and about 4 wt. % $NaHCO_3$, corresponding to a total alkali content of about 19.5 wt. % total alkali. Small differences in the dissolution solvent temperatures will not significantly change the composition; e.g., the corresponding equilibrated, saturated alkali solution at 86° F. (vs. 68° F. just noted above) will contain about 17 wt. % $Na_2CO_3$ and about 4.7 wt. % $NaHCO_3$, corresponding to a total alkali content of about 20 wt. % total alkali.

The aqueous alkali solution utilized as the second absorber section aqueous alkali stream may also be obtained as alkali liquor or solution that is withdrawn from a tailings disposal system associated with a soda ash manufacturing facility, in which dry-mined ore waste solids, i.e., tailings, are introduced as an aqueous slurry into a subterranean cavity and an alkali solution is subsequently withdrawn from the cavity for recovery of soda ash, such as described in U.S. Pat. No. 5,043,149 of Frint et al. (FMC) issued Aug. 27, 1991.

As mentioned above, another aqueous alkali solution process stream source that may be utilized as second absorber alkali solution streams are soda ash crystallizer feed streams that are used to precipitate and recover sodium carbonate species in a soda ash production facility. The crystallizer feed process streams may include the aqueous alkali solution feed streams used to crystallize sodium carbonate monohydrate, sodium carbonate decahydrate or sodium sesquicarbonate.

After the second absorber aqueous alkali solution stream is employed in the second section of the absorber, in the method of this invention, the second absorber effluent stream containing absorbed residual $H_2S$ is withdrawn from the second absorber section. Since the second absorption section functions as a "polishing step," to remove a relatively small amount of residual hydrogen sulfide from $H_2S$-depleted carbon dioxide gas stream, the spent absorber effluent withdrawn from the second section of the absorption apparatus consequently has a composition that contains only a small amount of solubilized hydrogen sulfide.

As was the case with the first absorber effluent stream, the second absorber effluent stream containing absorbed residual $H_2S$ that is withdrawn from the second absorber section is likewise not regenerated. The second absorber effluent stream containing absorbed residual $H_2S$ is preferably not recycled or otherwise re-used in the absorption unit operation.

The second absorber effluent stream containing absorbed residual $H_2S$ still contains valuable sodium carbonate values that may be readily recovered without interference from the relatively small amounts of absorbed hydrogen sulfide that are present. Several options are available for further processing of the "spent" second absorber effluent stream, to exploit and ultimately recover its solubilized $Na_2CO_3$ values in the soda ash production facility.

The spent absorber effluent withdrawn from the second section of the absorption apparatus may optionally be combined with an aqueous alkali solution process stream containing $Na_2CO_3$ in the soda ash production facility, so that the combined aqueous alkali process stream is processed further downstream to recover its solubilized alkali values in the form of a solid product, via crystallization, evaporation or carbonation, or combinations of these. Such solid form products may be soda ash (crystallized, e.g., as sodium carbonate monohydrate, sodium carbonate decahydrate, sodium sesquicarbonate or anhydrous sodium carbonate), sodium bicarbonate (crystallized, e.g., from carbonated $Na_2CO_3$-containing solutions or from $NaHCO_3$-containing solutions), or other sodium salt products, e.g., sodium sulfate. The $Na_2CO_3$-containing aqueous alkali solution process stream (into which is added the spent absorber effluent stream from the second absorber section) may be the same process stream from which the second absorber aqueous alkali solution stream was originally obtained as a deviated portion of such stream or may be a different process stream within the soda ash production facility.

Alternatively, the spent absorber effluent withdrawn from the second section of the absorption apparatus may optionally be directed to a subterranean solution mining cavity being worked at the soda ash production facility, since the withdrawn solution mining liquor will ultimately be utilized for recovery of its solubilized sodium carbonate values.

Still other possible uses of the spent absorber effluent withdrawn from the second section of the absorption apparatus, to exploit or otherwise recover its sodium carbonate values in the soda ash facility, will be readily apparent to one skilled in the art, based on the above-noted discussion, and are include within the scope of this invention.

Absorption Apparatus Design

The absorber apparatus employed in the present invention is a gas-liquid absorber that comprises a first absorber section (or segment) and a second absorption section (or segment). The $H_2S$-contaminated carbon dioxide gas stream or other $H_2S$-contaminated gas stream is sequentially contacted in these absorption sections with a first absorber alkali stream in the first absorber section and with a second absorber alkali stream in the second absorber section, the absorber solutions having been described above.

The absorber design used to effect the gas-liquid contact in the respective first and second absorber sections may be based on conventional equipment designs utilized for absorbing or scrubbing a gas stream with a liquid stream (the absorber or scrubber solution) to effect an absorptive transfer of a component in the gas stream into the liquid.

For purposes of the present disclosure, the terms absorber (absorption unit) and scrubber (scrubbing unit) are considered synonymous, since these terms are commonly used in the gas-liquid contacting art to describe similar operations and equipment.

A primary objective of the gas-liquid contacting steps in the first absorber section and in the second absorber section is ensuring intimate contact between the $H_2S$-containing gas stream and liquid absorber stream, so that the hydrogen sulfide, which is typically present in relatively small or moderate concentrations in the gas stream, e.g., less than 1 vol. % $H_2S$, becomes absorbed into the absorption liquid solution to the maximum extent possible.

The contact between the gas stream and an liquid absorber stream may be accomplished by conventional means used in gas-liquid contacting equipment, e.g., by spraying the liquid absorber stream into the gas stream (as is shown in the preferred embodiment described in the Example and illustrated in the FIGURE), by bubbling the gas stream through the liquid absorber stream, by creating a thin film of liquid absorber solution (e.g., on a packing material) that is contacted with the gas stream, or by other contacting means known to those skilled in the design of gas-liquid contacting equipment. The contacting of the gas stream and liquid absorber stream may be co-current, cross-current or counter-current in direction, with the primary objective being to ensure intimate contact between the gas stream and liquid absorber stream, to facilitate and promote absorptive transfer of $H_2S$ from the gas stream into the absorber solution.

The two absorber sections are designed in a manner that prevents unwanted transfer of the first absorber section absorption solution, having a high impurities content, into the second absorber section, where the second absorber section absorption solution is relatively free of impurities other than the absorbed $H_2S$. Such means may be a set of liquor de-entrainment vanes or the like, well known to those skilled in the design of gas-liquid absorption units. Likewise, similar means may be used to prevent the unwanted entrainment of second absorber section absorption solution in the purified, $H_2S$-depleted gas stream that exits from the second absorber section after being treated in that section.

In preferred embodiments of the invention where the gas stream is a $H_2S$-contaminated carbon dioxide-containing gas stream, the absorber sections are preferably designed to minimize absorption of carbon dioxide from the $CO_2$-rich gas stream into the absorber solution. An objective in each absorber section is to maximize absorptive transfer of the hydrogen sulfide in the $H_2S$-containing $CO_2$-rich gas stream into the absorber solution and to minimize absorptive transfer of carbon dioxide from the $H_2S$-containing $CO_2$-rich gas stream into the same absorber solution.

The absorption of carbon dioxide into the absorber solutions is undesirable in the method of this invention, since the absorbed carbon dioxide can react with the soluble sodium carbonate in the absorber solutions to form soluble sodium bicarbonate. This reaction is the reverse of reaction (1) which occurs in a carbon dioxide stripping unit operation, where a $CO_2$-rich gas stream is formed from the decomposition of sodium bicarbonate in solution.

Sodium bicarbonate is desirably minimized in process feed streams in soda ash production facilities, since increased sodium bicarbonate concentrations in $Na_2CO_3$- and $NaHCO_3$-containing process streams reduce the amount (quantity) of the desired sodium carbonate species (e.g., sodium carbonate monohydrate, sodium sesquicarbonate, sodium carbonate decahydrate) that can be crystallized from a unit volume of such solutions.

In the case of the second absorber section, the second absorber section effluent stream is utilized further in the method of this invention, for further processing and recovery of its solubilized $Na_2CO_3$ values in the soda ash production facility, so the presence of sodium bicarbonate in such absorber effluent solution is desirably minimized.

In the case of the impure alkali solutions used in the first absorber section, an increase of the sodium bicarbonate content of such solutions is likewise often undesirable since the increased sodium bicarbonate concentration may result in unwanted precipitation of solid alkali salts from such solutions. Alkali solutions used in the first absorber section are preferably crystallizer purge liquors, and these solutions contain near-saturation concentrations of some alkali salts, since such solutions are crystallizer mother liquor from crystallization (precipitation) of sodium carbonate monohydrate, sodium sesquicarbonate or sodium carbonate decahydrate.

If significant co-absorption of carbon dioxide from a $CO_2$-rich gas stream is allowed to occur during the absorption procedure, conversion of soluble sodium carbonate to bicarbonate via reaction with the absorbed carbon dioxide can cause an upward shift in the sodium bicarbonate concentration of alkali solutions used in the first absorber section (or even in the second absorber section) that may lead to the unwanted precipitation of alkali salts in the absorption apparatus during absorption of hydrogen sulfide.

For these reasons, the first absorber section and second absorber section are each preferably single absorption stage units. Single stage extraction is preferred to minimize the absorption of carbon dioxide from the $CO_2$-rich gas stream, during the desired absorptive removal of hydrogen sulfide into the absorber solution. Nevertheless, multistage extraction with either the first absorption section or the second absorption section is feasible, in the present invention.

Purified Gas Stream—$H_2S$ Removal Efficiencies

A particularly advantageous aspect of the present invention is that the gas-liquid absorption treatment for removal of hydrogen sulfide from $H_2S$-contaminated carbon dioxide gas streams or other $H_2S$-contaminated gas stream is highly efficient at removing significant amounts of the $H_2S$, regardless of the initial concentration or level of hydrogen sulfide contamination in the $CO_2$-rich gas stream.

The method is efficient at removing, via absorption into the aqueous alkali sodium carbonate solutions, hydrogen sulfide concentrations in $H_2S$-contaminated gas streams that are relatively high, e.g., at least about 0.1 vol. % $H_2S$ (1000 ppmv $H_2S$) or more or even about 0.5 vol. % $H_2S$ (5000 ppmv $H_2S$) or more, as well as hydrogen sulfide concentrations in $H_2S$-contaminated gas streams that are present in more moderate, lower concentrations, e.g., about 500 ppmv $H_2S$ or more, or about 300 ppmv $H_2S$ or more, or even about 100 ppmv $H_2S$ or more.

The method of this invention is readily capable of reducing the hydrogen sulfide in the treated, purified gas stream to less than 10%, and even less than 5%, of the concentration of hydrogen sulfide in the $H_2S$-contaminated gas stream initially introduced into the absorber for treatment. The method of this invention can provide treated, purified carbon dioxide gas streams whose hydrogen sulfide concentrations are less than about 1000 ppmv $H_2S$, more preferably less than about 500 ppmv $H_2S$, still more preferably less than about 100 ppmv $H_2S$, and most preferably less than about 30 ppmv $H_2S$.

The treatment efficiencies of the individual first and section sections of the absorber of this invention are likewise impressive, in their respective removals of hydrogen sulfide from the treated carbon dioxide gas streams. The first absorber section alkali stream is typically contacted with the $H_2S$-contaminated carbon dioxide gas stream in the first section in an amount sufficient to absorb at least 80%, and preferably 90%, of the $H_2S$ from the $H_2S$-contaminated gas stream. The second absorber section alkali stream is typically contacted with the $H_2S$-depleted gas stream in the second section in an amount sufficient to absorb at least 80%, and preferably 90%, of the $H_2S$ present in the $H_2S$-depleted gas stream entering the second absorber section.

The treatment method of this invention typically provides residual hydrogen sulfide concentrations in a treated, purified carbon dioxide gas stream or other treated, purified gas stream that are sufficiently low to obviate any need for an additional subsequent "polishing" $H_2S$-removal step to achieve further reduction of the residual $H_2S$ in the gas stream prior to its subsequent disposition after its withdrawal or exit from the second absorber section. The treated, purified gas stream may thus be released into the atmosphere, or, in the case of a treated, purified carbon dioxide gas stream, processed to recover its $CO_2$ content, or reused as a carbon dioxide-rich gas stream for carbonation of a process solution stream downstream in the soda ash production facility.

The significant advantage of high $H_2S$ removal efficiencies provided by the separate absorption steps in this invention, in the two absorber sections that use distinctly different aqueous alkali solutions as the liquid absorption streams, may be illustrated further by the following discussion, which explains how a very heavy absorption load can be safely shifted to the first absorption section, without adverse cost consequences. As has been discussed, the second absorber section absorption solution effluent is simply recycled back into the soda ash production facility, for recovery of its solubilized $Na_2CO_3$ values, without any special or separate steps being taken to remove the added, absorbed residual $H_2S$, much less to regenerate and recycle the absorption solution effluent back to the second absorber section for reuse. This factor makes the second absorption step in this invention different from traditional polishing absorption procedures, where the absorbed $H_2S$ is typically removed or otherwise recovered so that the polishing step absorption solution may be re-used, e.g. recycled to the polishing step.

In effect, the method of the present invention allows a very heavy absorption load to be placed on the first absorber section, because the absorption solution utilized in the second absorption step essentially provides a "free ride", since the latter requires no subsequent regeneration step and the spent absorption solution is still utilized for its original purpose, i.e., recovery of its solubilized $Na_2CO_3$ values. Importantly, this function of the second absorber section solution permits very high $H_2S$ absorption rates in the first absorption section, using an aqueous alkali waste stream as the first absorber section absorption solution, that provides very high "per unit of absorber solution" absorption rates. The "free ride" second absorption step minimizes concern that there might be an "out of specification" break through of $H_2S$ in the downstream carbon dioxide gas stream that is either exhausted to the atmosphere or utilized as a purified low-$H_2S$ carbon dioxide gas source, while at the same time not adding a cost burden to the overall absorption operating costs.

An optional step in the preferred embodiment of this invention involves further processing of the purified carbon dioxide gas stream exiting from the second absorber section and withdrawn from the absorption apparatus, so that a portion (preferably a significant portion, e.g., at least 50%) of its $CO_2$-content is either recovered or utilized further downstream, prior to release of the gas stream into the atmosphere. This additional step may involve (i) condensation of the $CO_2$-rich gas stream to recover carbon dioxide as relatively pure $CO_2$, a byproduct that is useful for carbonation of sodium carbonate to make sodium bicarbonate, or (ii) use of the purified, $H_2S$-depleted carbon dioxide-rich gas stream in the treatment of other process streams in the soda ash production facility, e.g., in the carbonation of an alkali solution stream containing soluble sodium carbonate to produce or crystallize sodium bicarbonate.

The following non-limiting Example illustrates a preferred embodiment of the present invention.

EXAMPLE

This Example describes the treatment of a $H_2S$-contaminated $CO_2$-containing gas stream from a soda ash facility, using an absorption apparatus with two sections, to absorb hydrogen sulfide from the carbon dioxide gas stream prior to release of the gas stream into the atmosphere. The Example is best understood by referring also to the FIGURE.

The $H_2S$-contaminated carbon dioxide gas stream is obtained from the $CO_2$ stripping step in an ELDM (evaporation-lime-decahydrate-monohydrate) soda ash process, which is described in U.S. Pat. No. 5,283,054 of Copenhafer et al. The $H_2S$-contaminated carbon dioxide gas stream 1 is introduced into an absorption apparatus A, as is shown on the right side of the FIGURE. The absorber A comprises two absorption sections, a horizontally-disposed first absorption section A1 and a vertically-oriented second absorption section A2, as is shown in the FIGURE.

The $H_2S$-contaminated carbon dioxide gas stream 1 entering the horizontally-disposed first section A1 of the absorber apparatus A is contacted with an alkali absorber solution 2 that is introduced into the absorber A1 via four separate spray nozzles, in a cross-flow orientation with respect to the flow direction of the gas stream, as shown in the FIGURE. The alkali absorber solution 2 is introduced via spraying into the first absorber section A1 at an overall flow rate of 850 gallons per minute, at a temperature of 51° F.

The alkali absorber solution 2 being introduced into the first section A1 of the absorber apparatus A is crystallizer purge solution from a soda ash facility. This first absorber section alkali solution stream 2 is a diverted portion of an aqueous alkali crystallizer liquor purge stream from a sodium carbonate decahydrate crystallizer. This decahydrate crystallizer mother liquor purge serves to prevent the unwanted buildup of impurities in the continuously-operated crystallizer and is normally directed to a waste holding pond for such purge liquor. The decahydrate crystallizer mother liquor's high impurities content renders such solution generally impractical for use as a feed stream for further recovery of its sodium carbonate content, so the use of this waste solution stream as the alkali absorber solution being introduced into the first section of the absorber apparatus provides additional economic value for this impurities-containing stream in the operation of the soda ash production facility.

The aqueous alkali decahydrate crystallizer purge liquor that is used as the first absorber section A1 alkali absorber solution 2 has the following composition:
 $Na_2CO_3$ 8 wt. %
 $NaHCO_3$ 3 wt. %
 NaCl 8 wt. %
 $Na_2SO_4$ 2 wt. %

The combined sodium carbonate and sodium bicarbonate contents (8 wt. % $Na_2CO_3$ and 3 wt. % $NaHCO_3$) in the first alkali absorber solution correspond to a total alkali content of 10%. The first alkali absorber solution 2 has a pH of about 10 and is at a temperature of 51° F. The relatively low temperature of the absorber solution 2 is advantageous since it improves selectivity of the $H_2S$ absorption relative to $CO_2$ absorption from the carbon dioxide-rich gas stream, as well as minimizing corrosion within the first absorber section.

The $Na_2CO_3$ content of the first alkali absorber solution 2 makes this solution particularly well suited for the absorptive removal of gaseous hydrogen sulfide from a gas stream.

The sprayed alkali absorber solution 2 is contacted with the incoming gas stream 1 in the first absorber section A1 in a cross-flow orientation, as shown in the FIGURE, and the intimate mixing of the liquid spray with the horizontally-flowing flowing gas stream 1 results in selective absorption of a significant portion of the $H_2S$ content of the gas stream into the alkali absorber liquid, with little concurrent absorption of $CO_2$ from the $CO_2$-rich gas stream.

The alkali absorber liquid containing absorbed hydrogen sulfide is collected via gravity in the lower portion of the first absorber section A1, and this spent alkali absorber effluent liquid is drained as stream 3 and pumped to a waste pond, at a flow rate of 862 gallons per minute.

The alkali absorber liquid effluent 3 that is collected in the waste pond (not shown in the FIGURE) contains the absorbed hydrogen sulfide, but this hydrogen sulfide in the waste liquor does not present a pollution problem since (i) the concentration of dissolved hydrogen sulfide in the waste liquor is relatively low and (ii) a portion of the dissolved sulfide is continuously converted by oxidation to sulfate, a natural reaction that is catalyzed via the presence of iron and other metallic impurities in the alkali waste liquor.

The $H_2S$-depleted carbon dioxide gas stream that exits the first absorber section within absorber apparatus is routed to the second absorber section A2, positioned in a vertical orientation, as is shown in the FIGURE.

In the second absorber section A2, the $H_2S$-depleted carbon dioxide gas stream is contacted with a second alkali absorber solution 4, different in composition and source from the first alkali absorber solution 2, to effect further absorptive removal of hydrogen sulfide from the $H_2S$-depleted carbon dioxide gas stream.

The $H_2S$-depleted carbon dioxide gas stream entering the vertically-oriented second section of the absorber apparatus is contacted in a countercurrent flow direction with a second alkali absorber solution 4 that is introduced into the absorber section A2 via three pairs of separate spray nozzles, as shown in the FIGURE. The stream of second alkali absorber solution 4 is introduced via spraying into the second absorber section A2 at an overall flow rate of 400 gallons per minute, at a temperature of 74° F.

The alkali absorber solution 4 being introduced into the second section A2 of the absorber apparatus is aqueous solution mining liquor obtained at the soda ash facility. This second absorber section alkali solution stream 4 is a diverted portion of aqueous mining solution that is withdrawn from the region of a subterranean solution mining cavity via a withdrawal well. This aqueous mining solution is an alkali feed stream that is normally processed in the soda ash production facility to decompose its $NaHCO_3$ content and then directed to a crystallizer for recovery of its dissolved $Na_2CO_3$ values as sodium carbonate monohydrate.

The aqueous mining solution, i.e., solution mining liquor which is also called mine water feed solution, that is used as the second absorber section A2 alkali absorber solution 4 has the following composition:
$Na_2CO_3$ 13 wt. %
$NaHCO_3$ 4 wt. %
NaCl<0.5 wt. %
$Na_2SO_4$<0.2 wt. %

The combined sodium carbonate and sodium bicarbonate contents (13 wt. % $Na_2CO_3$ and 4 wt. % $NaHCO_3$) in the aqueous mining solution correspond to a total alkali content of 15.5%. The aqueous alkali mining solution has a pH of about 10 and is at a temperature of 74° F.

The relatively high $Na_2CO_3$ content of this second alkali absorber solution 4 makes the solution particularly well suited for the absorptive removal of residual amounts of gaseous hydrogen sulfide from the $H_2S$-depleted carbon dioxide gas stream.

In the second absorber section A2, the sprayed alkali absorber solution 4 is contacted with the incoming $H_2S$-depleted carbon dioxide gas stream (from the first absorber section A1) in a countercurrent flow. The intimate mixing of the downwardly-directed liquid spray with the upwardly flowing gas stream results in absorption of a significant portion of the residual $H_2S$ content in the $H_2S$-depleted carbon dioxide gas stream into the alkali absorber liquid 4.

The upwardly-flowing $H_2S$-depleted carbon dioxide gas stream in the second section is then subjected to a second spray treatment with stream 5, as shown in the FIGURE, before it exits at the top of the absorption apparatus as a purified $H_2S$-depleted carbon dioxide gas stream. In this spray treatment, aqueous hot condensate (which is normally generated from evaporation of mine water feed solution as part of a separate process for recovering sodium carbonate in the soda ash facility) is introduced as stream 5 into the second absorber section A2, downstream of (i.e., above) the second section A2 alkali absorber solution 4 spray apparatus, via spraying.

The aqueous hot condensate stream 5 that is utilized in the latter portion of the second absorber stage A2 is essentially 100% water and is introduced at a flow rate of 25,000 to 75,000 lb/hr, corresponding to 50-150 gal/min, and is at a temperature of 180° F. The absence of impurities or other soluble components in the hot condensate stream 5 minimizes risk of corrosion in this absorber section.

The aqueous hot condensate stream 5 serves to transfer heat from this hot water stream to the treated gas stream, thus creating a buoyancy effect that facilitates exit of the upwardly-flowing treated gas stream from this section A2 of the gas absorption apparatus A. The spray of hot condensate water 5 also serves to clean the internal surfaces of the second absorber section A2 (i.e., a packed section for effecting heat transfer) as well as reducing entrained droplets of second section aqueous absorber solution (containing absorbed hydrogen sulfide) that may be carried along with the upwardly flowing gas stream.

As is also shown in the FIGURE, a stream 6 of about 10 gal/min of hot water is also be introduced intermittently into this second absorber section A2, to wash the de-entrainment vanes whose purpose is removal of entrained solution droplets from the upwardly-flowing gas stream.

The spent sprayed alkali absorber solution and hot condensate water are collected via gravity at bottom of the second absorber section A2 and are drained and removed as stream 7, at a flow rate of about 450-550 gallons per minute.

The alkali absorber effluent solution 7 (including the condensate liquor) from the second stage A2 contains a relatively low concentration of absorbed, dissolved hydrogen sulfide and contains lower levels of other contaminants (e.g., NaCl and $Na_2SO_4$), due to the diluent effect of the hot condensate water, as compared to the corresponding levels present in the aqueous mining solution used as second alkali absorber solution 4. In addition, the concentration of the soluble alkali values in the spent alkali absorber effluent solution 7 collected from the second absorber section is less than that in the incoming absorber solution introduced into the section absorber section A2, also due to the diluent effect of the hot condensate water used for gas stream temperature control.

The spent alkali absorber effluent liquid 7 collected from the second absorber section A2 is directed to a holding pond, as noted in the FIGURE, and ultimately processed further to recover its dissolved sodium carbonate values in the soda ash facility. The spent alkali absorber effluent liquid 7 is not regenerated or otherwise treated to remove its absorbed hydrogen sulfide. The spent alkali absorber effluent solution 7 is directed to a holding pond, as noted in the FIGURE, for settling of solids in the effluent. The clarified pond water is then injected (not shown in the FIGURE) into the mining cavity from which was obtained the aqueous solution mining liquor that was employed as alkali absorber solution 4 introduced into the second section A2 of the absorber apparatus A.

The purified $H_2S$-depleted carbon dioxide gas stream 8 exits at the top of absorption apparatus A at an outlet flow rate of about 5,400 ACFM, at a temperature of about 120° F., as shown on the FIGURE. The composition of the exiting purified $H_2S$-depleted carbon dioxide gas stream 8 is as follows, with the gaseous constituents again being expressed as pounds per hour exiting the absorber:
$CO_2$ 25,450 lb/hr
$H_2O$ 460 lb/hr
$O_2$ 300 lb/hr
$N_2$ 1,150 lb/hr
$H_2S$<5.3 lb/hr The absorption treatment of the $H_2S$-contaminated $CO_2$-containing gas stream 1 effects a significant reduction in hydrogen sulfide content, from 350 lb/hr inlet to <5.3 lb/hr outlet, a reduction of over 98% as compared to the inlet gas composition. The concentration of hydrogen sulfide in the exiting purified $H_2S$-depleted carbon dioxide gas stream 8 that is withdrawn from the gas absorption apparatus A is about 200 ppm (wt.). The exiting purified $H_2S$-depleted carbon dioxide gas stream 8 is exhausted into the atmosphere.

The procedural steps described in the Example may be modified as follows, in alternative embodiments of the Example:

The flow of the aqueous mining solution used as absorber solution 4 in the second section A2 of the absorber may be adjusted as desired (the solution stream being directed to the first set of spray nozzles in the second section A2 of the absorption apparatus) to obtain greater or lesser $H_2S$ removal rates in the second absorber section.

The spent alkali absorber effluent solution collected from the second absorber section A2 as stream 7 may alternatively be employed in the soda ash facility in any of the following ways, each of which ultimately results in recovery of its soluble alkali values:

The spent alkali absorber effluent solution 7 may be added to the alkali feed solution stream destined for the $CO_2$ stripping unit operation, to decompose its $NaHCO_3$ content.

The spent alkali absorber effluent solution 7 may be added to the aqueous solution mining liquor stream, a portion of which is diverted and employed as alkali absorber solution in the second absorber section It will be appreciated by those skilled in the art that changes could be made to the embodiments described above without departing from the broad inventive concept thereof. It is understood, therefore, that this invention is not limited to the particular embodiments disclosed but is intended to cover modifications within the spirit and scope of the present invention as defined by the appended claims.

What is claimed is:

1. A method for removing hydrogen sulfide from a carbon dioxide gas stream in a soda ash production facility comprising introducing a $H_2S$-contaminated carbon dioxide gas stream from a carbon dioxide stripping unit operation in a soda ash production facility containing at least 20 vol % $CO_2$ into a gas absorption apparatus for sequential contact of the gas stream with a first absorber alkali stream in a first absorber section and with a second absorber alkali stream in a second absorber section, wherein the first absorber alkali stream is an aqueous alkali waste stream containing at least 1 wt. % $Na_2CO_3$ and solubilized impurities from the soda ash production facility and is contacted with the $H_2S$-contaminated carbon dioxide gas stream in the first absorber section of the gas absorption apparatus in an amount sufficient to absorb a substantial amount of the $H_2S$ from the gas stream to produce a $H_2S$-depleted carbon dioxide gas stream and a first absorber effluent stream containing the absorbed $H_2S$, and wherein the second absorber alkali stream is an aqueous process stream containing at least 1 wt. % $Na_2CO_3$ from the soda ash production facility and is contacted with the $H_2S$-depleted carbon dioxide gas stream in the second absorber section of the gas absorption apparatus in an amount sufficient to absorb a substantial amount of the residual $H_2S$ in the $H_2S$-depleted carbon dioxide gas stream from the gas stream to produce a purified carbon dioxide gas stream and a second absorber effluent stream containing the absorbed residual $H_2S$; withdrawing the first absorber effluent stream containing absorbed $H_2S$ and solubilized impurities from the first absorber section; withdrawing the second absorber effluent stream containing absorbed residual $H_2S$ from the second absorber section and thereafter utilizing the second absorber effluent stream in the soda ash production facility, for further processing for recovery of its solubilized $Na_2CO_3$ values; and withdrawing the purified carbon dioxide gas stream from the gas absorption apparatus.

2. The method of claim 1 wherein the first absorber section and the second absorber section are each a single stage absorption unit and a portion of the first absorber effluent stream is recycled to the first absorber section.

3. The method of claim 1 wherein the $H_2S$-contaminated carbon dioxide gas stream obtained from the carbon dioxide stripping unit operation in a soda ash production facility contains at least about 30 vol. % CO.sub.2.

4. The method of claim 1 wherein the $H_2S$-contaminated carbon dioxide gas stream obtained from the carbon dioxide stripping unit operation in a soda ash production facility contains at least about 0.1 vol. % $H_2S$.

5. The method of claim 1 wherein the first absorber alkali stream is obtained from a source selected from group consisting of monohydrate crystallizer purge solution, decahydrate crystallizer purge solution, sesquicarbonate crystallizer purge solution, sodium bicarbonate crystallizer purge solution, trona mechanical mining waste water, surface holding pond alkali water, impure natural alkali lake brines, and combinations of these.

6. The method of claim 1 wherein the alkali stream contacted with the gas stream in the first absorber section contains at least about 5 wt. % $Na_2CO_3$.

7. The method of claim 1 wherein the second absorber alkali stream is obtained from a source selected from the group consisting of aqueous alkali mining solutions recovered from solution mining of trona, nahcolite or other NaHCO.sub.3-containing mineral ores and crystallizer feed stream solutions, used to crystallize sodium carbonate monohydrate, sodium carbonate decahydrate, sodium sesquicarbonate or sodium bicarbonate.

8. The method of claim 1 wherein the alkali stream contacted with the gas stream in the second absorber section contains at least about 5 wt. % $Na_2CO_3$.

9. The method of claim 1 wherein the absorption of hydrogen sulfide effected in the first and second absorber sections is sufficient to reduce the hydrogen sulfide in the purified carbon dioxide gas stream to less than 10% of the concentration of hydrogen sulfide in the $H_2S$-contaminated carbon dioxide gas stream introduced into the absorber.

10. The method of claim 1 wherein the purified carbon dioxide gas stream withdrawn from the gas absorption apparatus contains less than 100 ppmv $H_2S$.

11. A method for removing hydrogen sulfide from a gas stream in a soda ash production facility comprising introducing a $H_2S$-contaminated gas stream in a soda ash production facility containing at least 20 vol % $CO_2$ into a gas absorption apparatus for sequential contact of the gas stream with a first absorber alkali stream in a first absorber section and with a second absorber alkali stream in a second absorber section, wherein the first absorber alkali stream is an aqueous alkali waste stream containing at least 1 wt. % $Na_2CO_3$ and solubilized impurities from the soda ash production facility and is contacted with the $H_2S$-contaminated gas stream in the first absorber section of the gas absorption apparatus in an amount sufficient to absorb a substantial amount of the $H_2S$ from the gas stream to produce a $H_2S$-depleted gas stream and a first absorber effluent stream containing the absorbed $H_2S$, and wherein the second absorber alkali stream is an aqueous process stream containing at least 1 wt. % $Na_2CO_3$ from the soda ash production facility and is contacted with the $H_2S$-depleted gas stream in the second absorber section of the gas absorption apparatus in an amount sufficient to absorb a substantial amount of the residual $H_2S$ in the $H_2S$-depleted gas stream from the gas stream to produce a purified gas stream and a second absorber effluent stream containing the absorbed residual $H_2S$; withdrawing the first absorber effluent stream containing absorbed $H_2S$ and solubilized impurities from the first absorber section; withdrawing the second absorber effluent stream containing absorbed residual $H_2S$ from the second absorber section and thereafter utilizing the second absorber effluent stream in the soda ash production facility, for further processing for recovery of its solubilized $Na_2CO_3$ values; and withdrawing the purified gas stream from the gas absorption apparatus.

12. The method of claim 11 wherein the $H_2S$-contaminated gas stream contains at least 30 vol % carbon dioxide.

13. The method of claim 11 wherein the first absorber section and the second absorber section are each a single stage absorption unit and a portion of the first absorber effluent stream is recycled to the first absorber section.

14. The method of claim 11 wherein the $H_2S$-contaminated gas stream in the soda ash production facility contains at least about 0.1 vol. % $H_2S$.

15. The method of claim 11 wherein the first absorber alkali stream is obtained from a source selected from group consisting of monohydrate crystallizer purge solution, decahydrate crystallizer purge solution, sesquicarbonate crystallizer purge solution, sodium bicarbonate crystallizer purge solution, trona mechanical mining waste water, surface holding pond alkali water, impure natural alkali lake brines, and combinations of these.

16. The method of claim 11 wherein the alkali stream contacted with the gas stream in the first absorber section contains at least about 5 wt. % $Na_2CO_3$.

17. The method of claim 11 wherein the second absorber alkali stream is obtained from a source selected from the group consisting of aqueous alkali mining solutions recovered from solution mining of trona, nahcolite or other $NaHCO_3$-containing mineral ores and crystallizer feed stream solutions, used to crystallize sodium carbonate monohydrate, sodium carbonate decahydrate, sodium sesquicarbonate or sodium bicarbonate.

18. The method of claim 11 wherein the alkali stream contacted with the gas stream in the second absorber section contains at least about 5 wt. % $Na_2CO_3$.

19. The method of claim 11 wherein the absorption of hydrogen sulfide effected in the first and second absorber sections is sufficient to reduce the hydrogen sulfide in the purified gas stream to less than 10% of the concentration of hydrogen sulfide in the $H_2S$-contaminated gas stream introduced into the absorber.

20. The method of claim 19 wherein the purified gas stream withdrawn from the gas absorption apparatus contains less than 100 ppmv $H_2S$.

* * * * *